(12) United States Patent
Hori et al.

(10) Patent No.: US 7,420,925 B2
(45) Date of Patent: Sep. 2, 2008

(54) DUPLEX SYSTEM OF WIRELESS LAN BASE STATIONS

(75) Inventors: Masato Hori, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 831 days.

(21) Appl. No.: 10/687,621

(22) Filed: Oct. 20, 2003

(65) Prior Publication Data

US 2004/0092287 A1 May 13, 2004

(30) Foreign Application Priority Data

Nov. 11, 2002 (JP) ............................. 2002-327020

(51) Int. Cl.
*G01R 31/08* (2006.01)
(52) U.S. Cl. ...................................... 370/242
(58) Field of Classification Search ................ 370/338, 370/349, 347, 242, 244, 245, 250
See application file for complete search history.

(56) References Cited

U.S. PATENT DOCUMENTS 5,570,343 A * 10/1996 Bishop et al. ................ 370/216
6,591,150 B1 * 7/2003 Shirota ......................... 700/82

FOREIGN PATENT DOCUMENTS

| JP | 61-152141 | * | 7/1986 |
| JP | 07-057157 | * | 3/1995 |
| JP | 07-226752 | A | 8/1995 |
| JP | 07-322341 | | 12/1995 |
| JP | 09-149072 | * | 6/1997 |
| JP | 09-326810 | A | 12/1997 |
| JP | 2000-253028 | | 9/2000 |
| JP | 2000-307723 | | 11/2000 |
| JP | 2001-077919 | | 3/2001 |
| JP | 2001-103156 | * | 4/2001 |
| JP | 2001-103156 | A | 4/2001 |
| JP | 2001-358744 | A | 12/2001 |
| JP | 2002-084286 | | 3/2002 |

* cited by examiner

*Primary Examiner*—Seema S. Rao
*Assistant Examiner*—Mon Cheri S Davenport
(74) *Attorney, Agent, or Firm*—Foley & Lardner LLP

(57) ABSTRACT

A first wireless LAN base station is in an active state. A second wireless LAN base station is in a power off state or a power save mode. The first wireless LAN base station and the second wireless LAN base station are disposed in the same support area. When a fault occurs in the first wireless LAN base station and a communication state of the wireless LAN deteriorates, the first wireless LAN base station detects the fault and places the second wireless LAN base station in the active state. When the first wireless LAN base station confirms that the second wireless LAN base station has been placed in the active state, the first wireless LAN base station sends setting thereof to the second wireless LAN base station. When the first wireless LAN base station confirms that the setting of the second wireless LAN base station is the same as the setting of the first wireless LAN base station, the first wireless LAN base station enters the power off state or the power save mode.

21 Claims, 10 Drawing Sheets

DUPLEX SYSTEM OF WIRELESS LAN BASE STATIONS

BACKGROUND OF THE INVENTION

1. Field of the Invention

The present invention relates to a duplex system of wireless LAN base stations that allows the reliability of communication to be improved.

2. Description of the Related Art

In conventional mobile communication systems and so forth, there is an apparatus that has an active device and a standby device of which setting information of the active device is set to the standby device so that when the active device is switched to the standby device, it is not necessary to transfer the setting information of the active device to the standby device (for example, refer to Related Patent Reference 1).

Related Patent Reference 1: Japanese Patent Publication No. 2001-103156 A

However, when a fault occurs in a wireless LAN base station due to any cause or when the communication state remarkably deteriorates, it is necessary to manually restore the wireless LAN system. Thus, the reliability of the wireless LAN system cannot be assured.

SUMMARY OF THE INVENTION

An object of the present invention is to provide a duplex system of wireless LAN base stations that allows communication to be automatically restored in the case that a fault occurs in a wireless LAN base station and the communication state deteriorates.

To solve the foregoing problem, according to the present invention, as shown in FIG. 1, a first wireless LAN base station 100 is in an active state. A second wireless LAN base station 200 is in a power off state or a power save mode. The first wireless LAN base station 100 and the second wireless LAN base station 200 are disposed in the same support area.

When a fault occurs in the first wireless LAN base station 100 and the communication state of the wireless LAN deteriorates, the fault is detected and the second wireless LAN base station 200 which is in the standby state is placed in the active state. When the first wireless LAN base station 100 confirms that the second wireless LAN base station 200 has been placed in the active state, the first wireless LAN base station 100 sends setting thereof to the second wireless LAN base station 200. When the first wireless LAN base station 100 confirms that the setting of the second wireless LAN base station 200 is the same as the setting of the first wireless LAN base station 100, the first wireless LAN base station 100 enters the power off state or power save mode.

According to the present invention, wireless LAN base stations are duplexed. When a fault occurs in a wireless LAN base station that is in an active state, since a wireless LAN base station that is in a standby state is automatically placed in the active state with the same setting as the wireless LAN base station in which the fault occurs. Thus, even if a fault occurs in a wireless LAN base station, the operation thereof can be automatically restored.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, with reference to the accompanying drawings, embodiments of the present invention will be described.

First Embodiment

Figure 1:
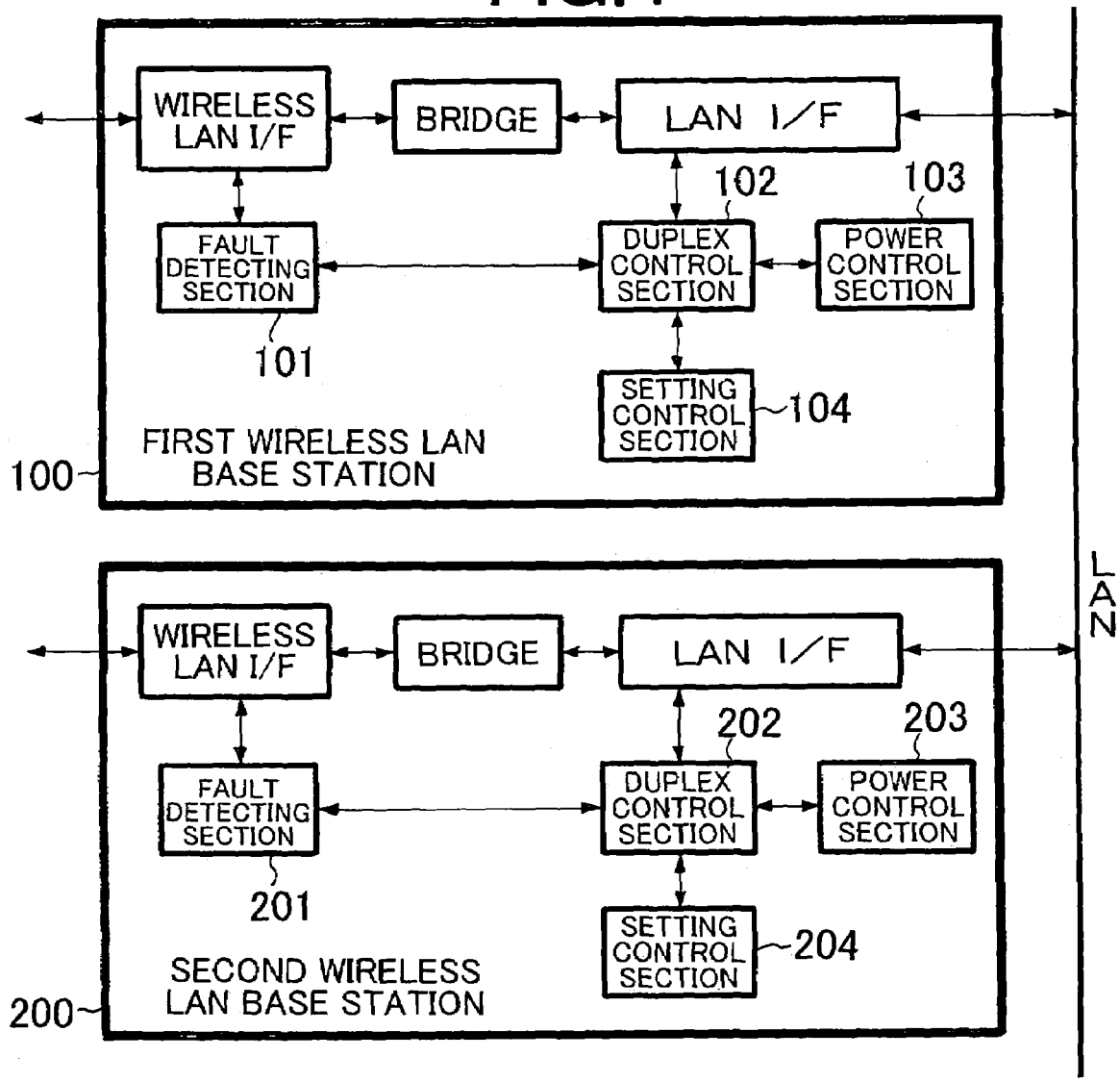
FIG. 1 is a schematic diagram showing a structure of a first embodiment of the present invention.

FIG. 1 shows a structure of a first embodiment of the present invention. The first embodiment includes a first wireless LAN base station 100 that is in an active state and a second wireless LAN base station 200 that is in a standby state (power off state or power save mode). The first wireless LAN base station 100 and the second wireless LAN base station 200 are disposed in the same support area.

Each of the first wireless LAN base station 100 and the second wireless LAN base station 200 has a fault detecting section, a duplex control section, a power control section, and a setting control section. The fault detecting section detects a fault that occurs in the local wireless LAN base station and generates a fault detection signal. The duplex control section has stored an address of a duplex party of the wireless LAN base station. The duplex control section sends and receives a control signal to and from the duplex party and controls each of sections according to the control signal. The power control section places the local wireless LAN base station in the active state or standby state according to a command received from the duplex control section. The setting control section stores setting of the local wireless LAN base station and sends and receives the setting according to a command received from the duplex control section.

A wireless LAN I/F of each wireless LAN base station is an interface section that wireless communicates with a wireless LAN client. A LAN I/F is an interface section that connects the local wireless LAN base station to the LAN. A bridge has a function for connecting each interface section.

Figure 2:
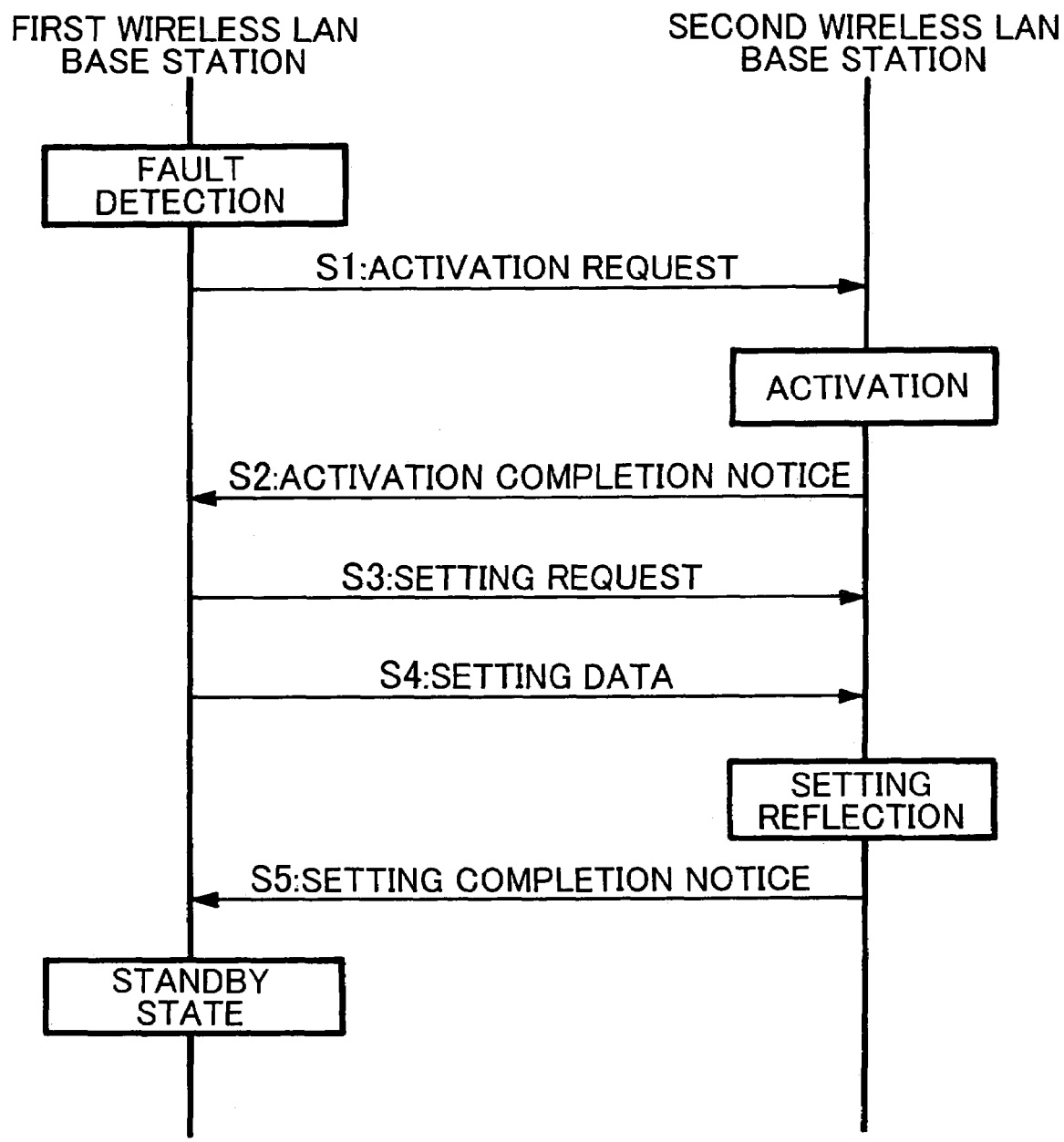
FIG. 2 is a sequence diagram showing an operation of the first embodiment of the present invention.

Next, with reference to FIG. 1 and FIG. 2, an operation of the present embodiment will be described.

When a fault occurs in the first wireless LAN base station 100 which is in the active state, a fault detecting section 101 generates a fault detection signal. When a duplex control section 102 receives the fault detection signal, the duplex control section 102 sends an activation request to the second wireless LAN base station 200 as a duplex party (at step S1).

When a duplex control section 202 of the second wireless LAN base station 200 which is in the standby state receives the activation request, the duplex control section 202 controls a power control section 203 so as to place the second wireless LAN base station 200 in the active state.

After the second wireless LAN base station 200 has been placed in the active state, the duplex control section 202 sends an activation completion notice to the first wireless LAN base station 100 (at step S2).

When the duplex control section 102 receives the activation completion notice, the duplex control section 102 reads setting data stored in a setting control section 104 therefrom and sends a setting request and setting data to the second wireless LAN base station 200 (at steps S3 and S4).

When the duplex control section 202 receives the setting request, the duplex control section 202 controls a setting control section 204 so as to reflect the received setting data in the second wireless LAN base station 200. When the setting control section 204 reflects the received setting data in the second wireless LAN base station 200, the setting control section 204 sends a setting completion notice to the first wireless LAN base station 100 (at step S5).

When the duplex control section 102 receives the setting completion notice, the duplex control section 102 controls a power control section 103 so as to place the first wireless LAN base station 100 in the standby state.

As a method for placing a wireless LAN base station in the active state or the standby state, the Wake On LAN technology or the IEEE 802.11 power save control technology would be used.

Second Embodiment

Figure 3:
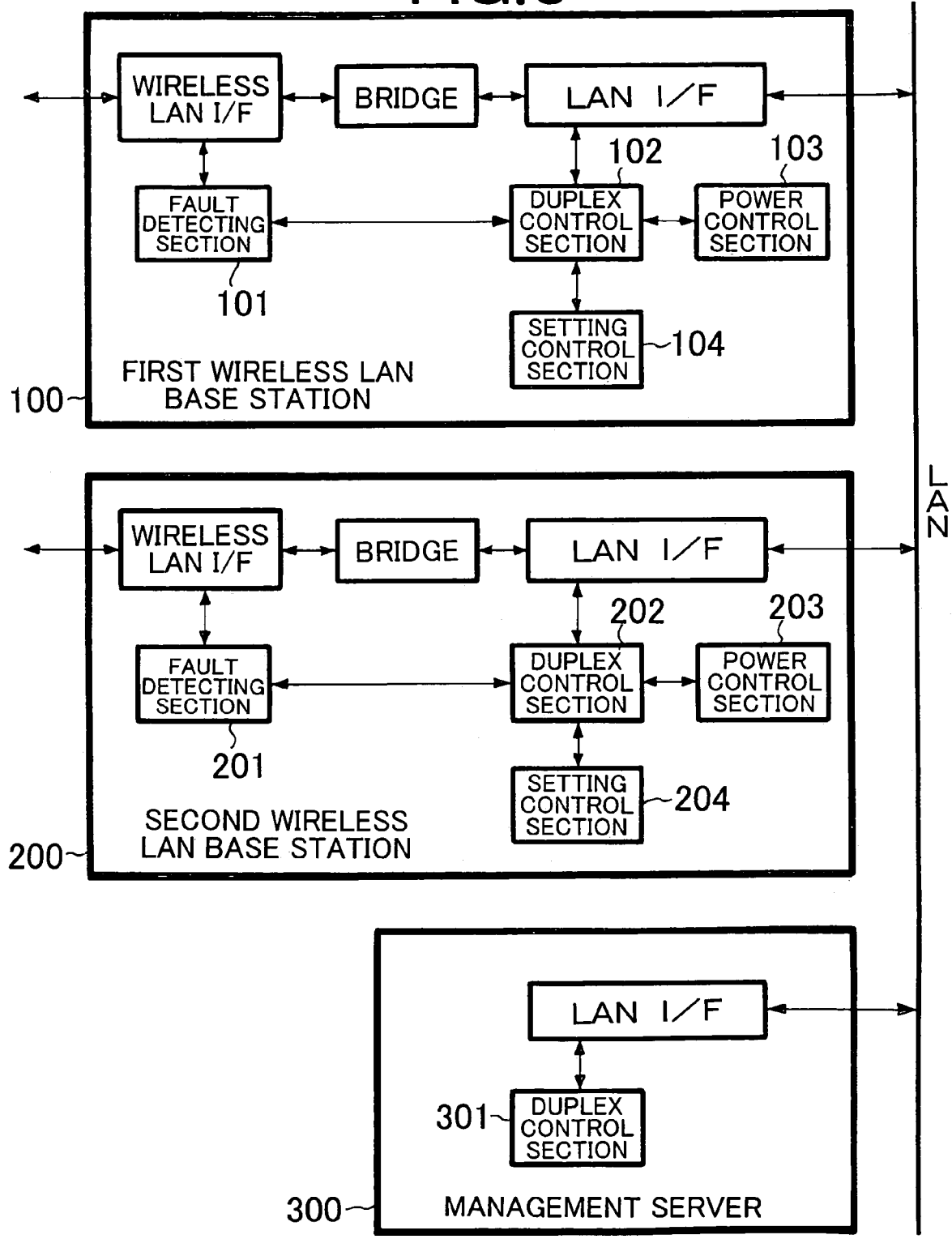
FIG. 3 is a schematic diagram showing a structure of a second embodiment of the present invention.

FIG. 3 shows a structure of a second embodiment of the present invention. The second embodiment is different from the first embodiment in that the former has a management server 300 along with the structure of the first embodiment shown in FIG. 1.

The management server 300 has a duplex control section 301. The duplex control section 301 has stored addresses of duplexed wireless LAN base stations. The duplex control section 301 sends and receives control signals to and from the duplexed wireless LAN base stations and controls each of sections according to the control signals.

Each of the duplex control sections 102 and 202 of the wireless LAN base stations has stored an address of the management server 300. Each of the duplex control sections 102 and 202 sends and receives a signal to and from the management server 300.

Figure 4:
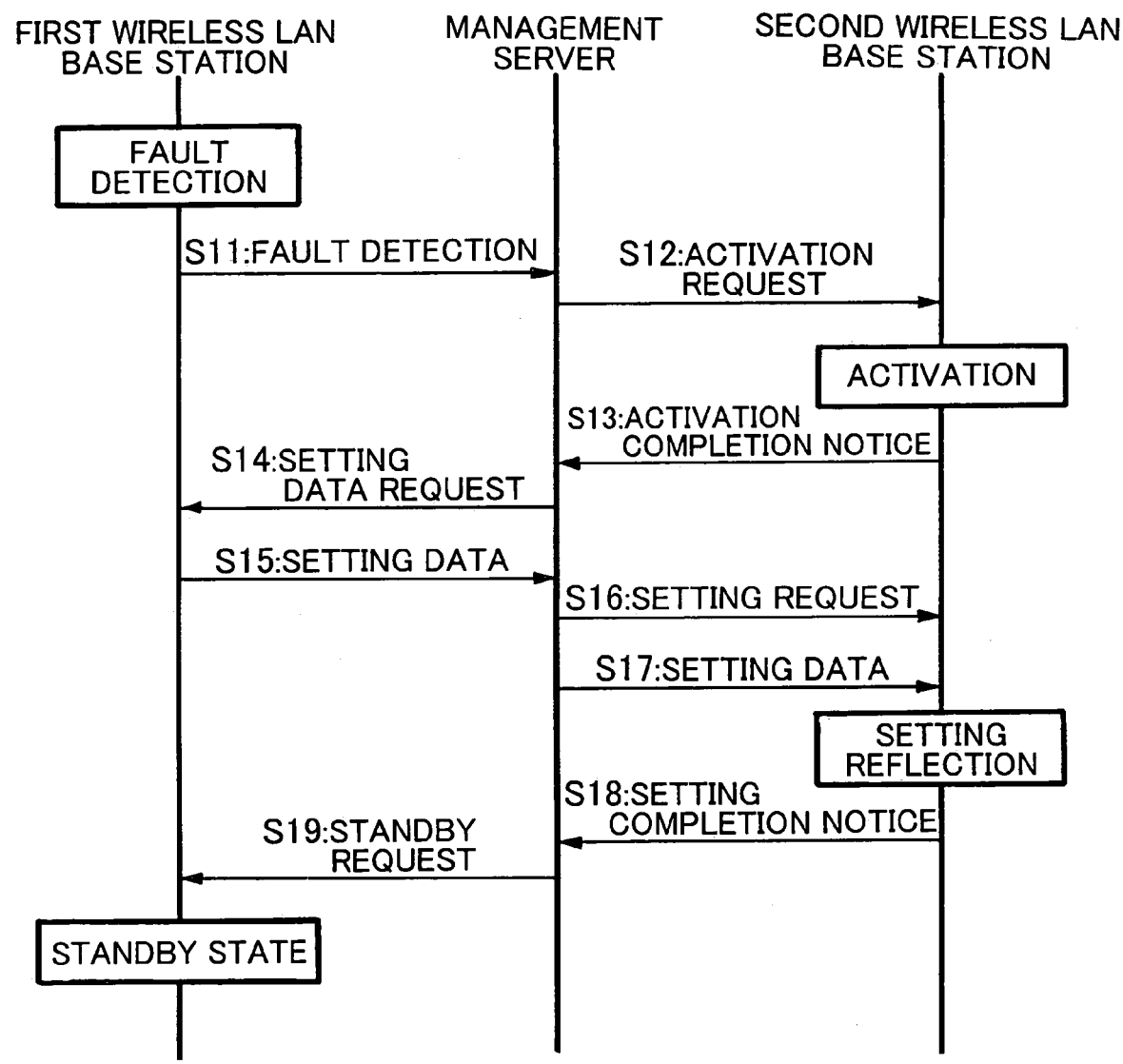
FIG. 4 is a sequence diagram showing an operation of the second embodiment of the present invention.
Figure 5:
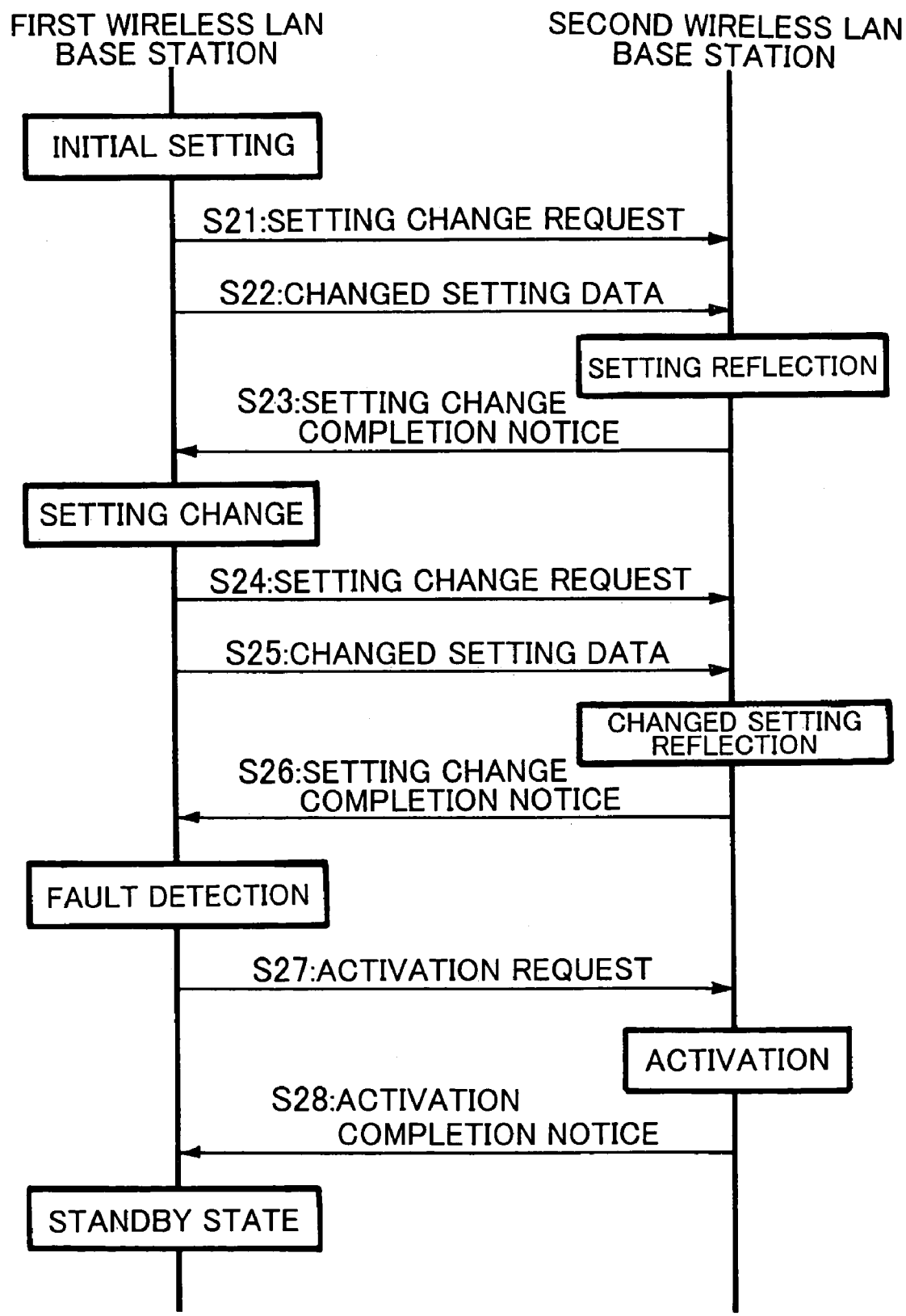
FIG. 5 is a sequence diagram showing an operation of a third embodiment of the present invention.

Next, with reference to FIG. 3 and FIG. 4, an operation of the second embodiment will be described.

When a fault occurs in a first wireless LAN base station 100 that is in an active state, a fault detecting section 101 generates a fault detection signal. The duplex control section 102 sends a fault detection signal to the management server 300 (at step S11).

When the duplex control section 301 of the management server 300 receives the fault detection signal, the duplex control section 301 sends an activation request to a duplex party of the second wireless LAN base station 200 whose address the duplex control section 301 has stored (at step S12).

When the duplex control section 202 of the second wireless LAN base station 200 which is in the standby state receives the activation request, the duplex control section 202 controls the power control section 203 so as to place the second wireless LAN base station 200 in the active state.

When the second wireless LAN base station 200 is placed in the active state, the duplex control section 202 sends an activation completion notice to the management server 300 (at step S13).

When the duplex control section 301 receives the activation completion notice, the duplex control section 301 sends a setting data request to the first wireless LAN base station 100 in which a fault occurs (at step S14).

When the duplex control section 102 receives the setting data request, the duplex control section 102 reads setting data stored in a setting control section 104 therefrom and sends the setting data to the management server 300 (at step S15).

When the duplex control section 301 receives the setting data, the duplex control section 301 sends a setting request and setting data to the second wireless LAN base station 200 which is newly in the active state (at steps S16 and S17).

When the duplex control section 202 receives the setting request, the duplex control section 202 controls a setting control section 204 so as to reflect the received setting data in the second wireless LAN base station 200. When the setting control section 204 completes reflecting the setting data in the second wireless LAN base station 200, the setting control section 204 sends a setting completion notice to the management server 300 (at step S18).

When the duplex control section 301 receives the setting completion notice, the duplex control section 301 sends a standby request to the first wireless LAN base station 100, in which a fault occurs (at step S19).

When the duplex control section 102 receives the standby request, the duplex control section 102 controls a power control section 103 so as to place the first wireless LAN base station 100 in the standby state.

According to the second embodiment, to allow the management server 300 to manage addresses of duplexed wireless LAN base stations, the wireless LAN base stations that are controlled by the management server 300 need to know only the server's address. Thus, the management server 300 can manage a plurality of duplexed wireless LAN base stations as a new effect of the present invention.

Third Embodiment

A third embodiment of the present invention is different from the first embodiment in that a first wireless LAN base station 100 of the former has a setting control section 104 that detects changed setting and a duplex control section 102 that sends a setting change request and changed setting data to a second wireless LAN base station 200 that is in a standby state along with the structure of the first embodiment shown in FIG. 1.

Next, with reference to FIG. 1 to FIG. 3, an operation of the third embodiment will be described.

When initial setting is performed for the first wireless LAN base station 100 which is in the active state, a setting control section 104 detects changed setting and generates a changed setting detection signal. The duplex control section 102 reads changed setting data from the setting control section 104 and sends a setting change request and changed setting data to the second wireless LAN base station 200 (at steps S21 and S22).

When a duplex control section 202 receives the setting change request, the duplex control section 202 controls a setting control section 204 so as to reflect the received changed setting data in the second wireless LAN base station 200. After the setting control section 204 has reflected the changed setting data in the second wireless LAN base station

200, the setting control section 204 sends a setting change completion notice to the first wireless LAN base station 100 (at step S23).

Whenever setting of the first wireless LAN base station 100 which is in the active state is changed, the changed setting is reflected in the second wireless LAN base station 200 which is in the standby state (at steps S24 to S26).

When a fault occurs in the first wireless LAN base station 100 which is in the active state, a fault detecting section 101 generates a fault detection signal. When the duplex control section 102 receives the fault detection signal, the duplex control section 102 sends an activation request to the second wireless LAN base station 200 (at step S27).

When the duplex control section 202 receives the activation request, the duplex control section 202 controls a power control section 203 so as to place in the active state the second wireless LAN base station 200 which is in the standby state.

After the second wireless LAN base station 200 has been placed in the active state, the duplex control section 202 sends a activation completion notice to the first wireless LAN base station 100 (at step S28).

When the duplex control section 102 receives the activation completion notice, the duplex control section 102 controls a power control section 103 so as to place the first wireless LAN base station 100 in the standby state.

Figure 6:
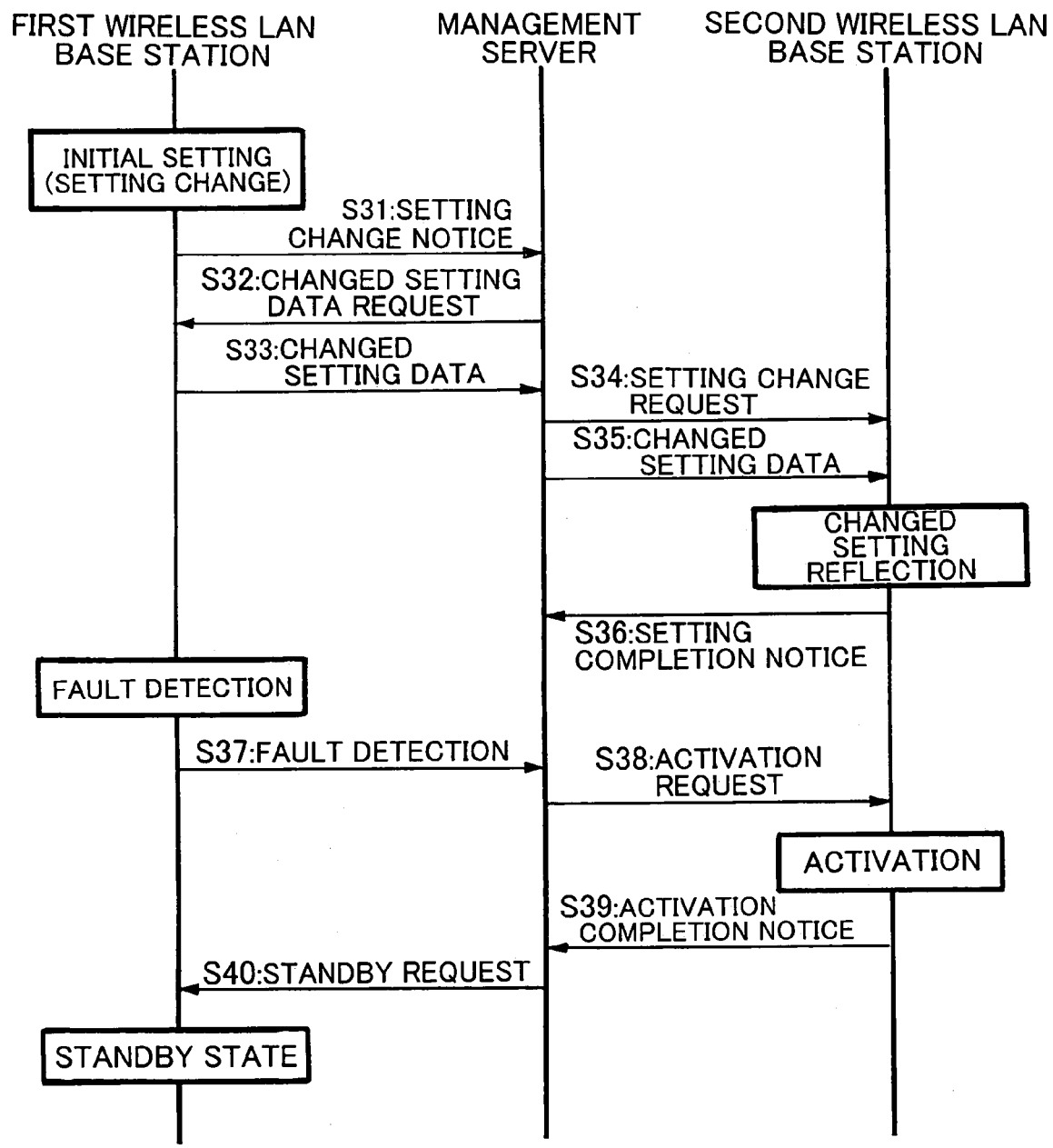
FIG. 6 is a sequence diagram showing another operation of the third embodiment of the present invention.

The third embodiment may be accomplished by the structure of the second embodiment. In this case, the sequence of the operation of the third embodiment is shown in FIG. 6.

According to the third embodiment, before a fault occurs, setting of a wireless LAN base station that is in an active state has been reflected in a wireless LAN base station that is in a standby state. Thus, setting of the wireless LAN base station in the active state can be backed up. As a result, the operation of the wireless LAN base station in which the fault occurred can be quickly restored as a new effect of the present invention.

Fourth Embodiment

Figure 7:
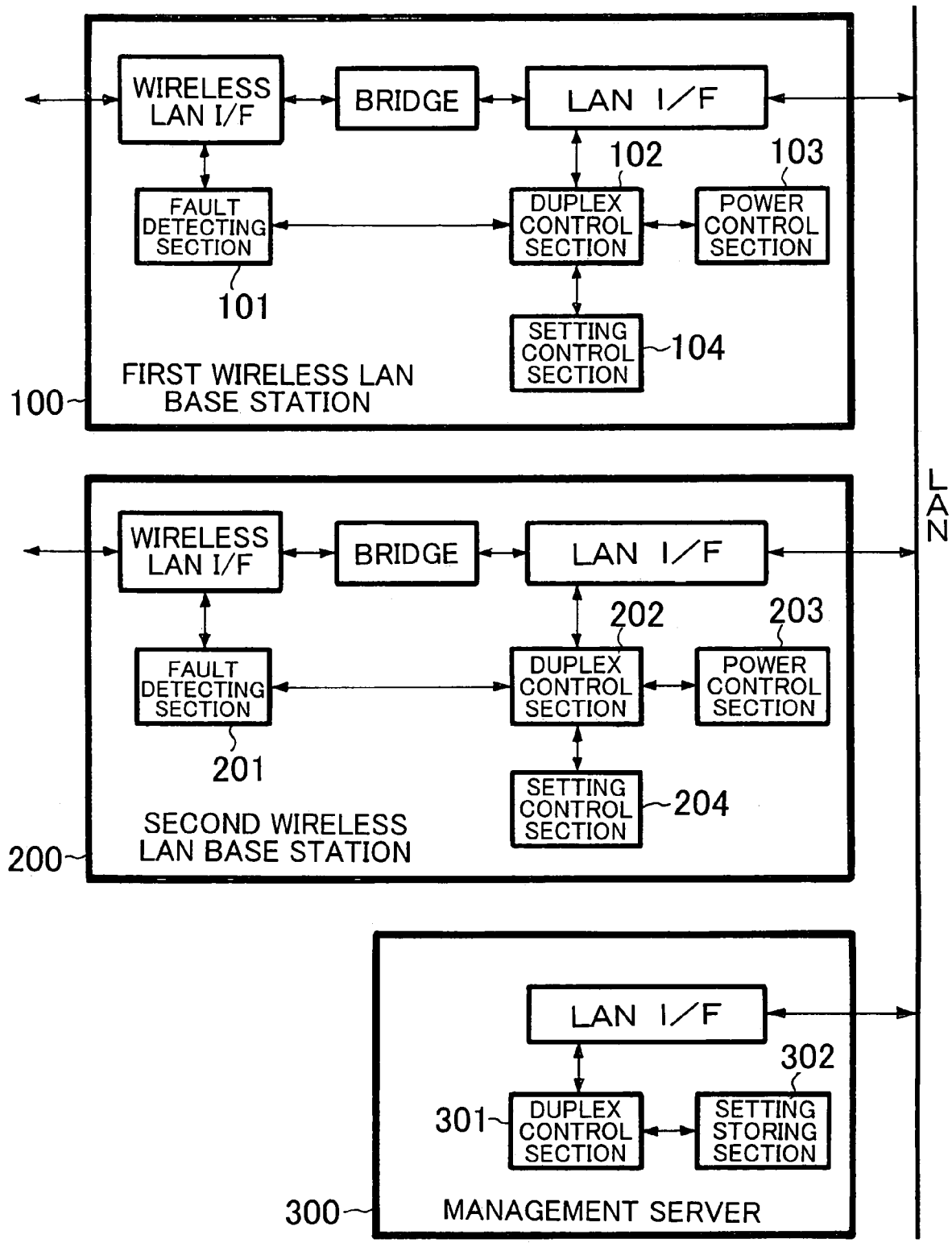
FIG. 7 is a schematic diagram showing a structure of a fourth embodiment of the present invention.

FIG. 7 shows a structure of a fourth embodiment of the present invention. The fourth embodiment is different from the second embodiment in that the former has a setting storing section 302 in a management server 300 along with the structure of the second embodiment shown in FIG. 3. The setting storing section 302 stores changed setting data of a first wireless LAN base station 100 that is in an active state.

Figure 8:
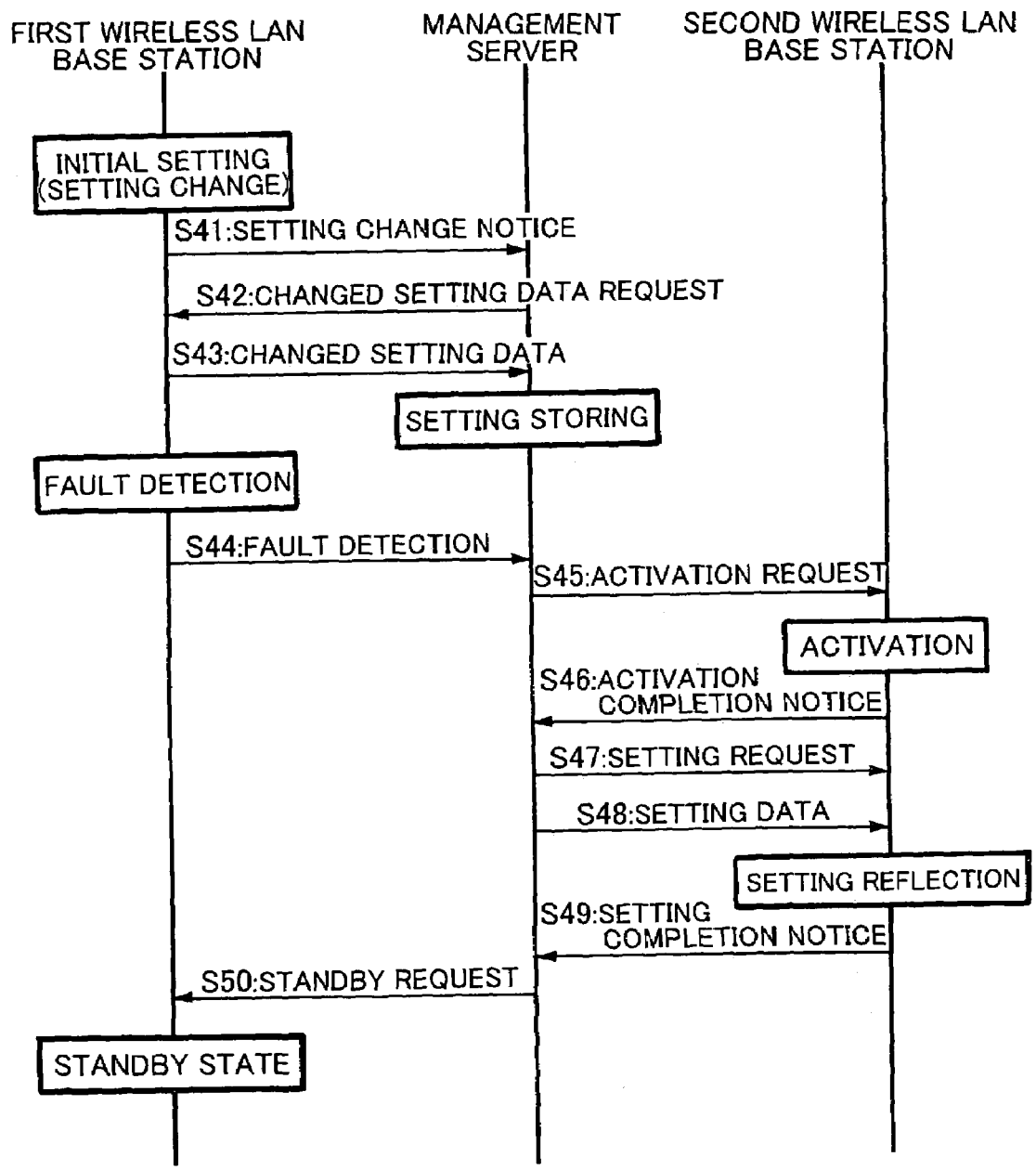
FIG. 8 is a sequence diagram showing an operation of the fourth embodiment of the present invention.

Next, with reference to FIG. 7 and FIG. 8, an operation of the fourth embodiment will be described.

Since S44 to S45 and S47 to S49 of the fourth embodiment are the same as those of the second embodiment, their description will be omitted.

When initial setting is performed for the first wireless LAN base station 100 which is in the active state, a setting control section 104 detects changed setting and generates a changed setting detection signal. A duplex control section 102 sends a setting completion notice to the management server 300 (at step S41).

When a duplex control section 301 receives the setting change notice, the duplex control section 301 sends a changed setting data request to the first wireless LAN base station 100 which is in the active state (at step S42).

When the duplex control section 102 receives the changed setting data request, the duplex control section 102 reads changed setting data from the setting control section 104 and sends the changed setting data to the management server 300 (at step S43).

When the duplex control section 301 receives the changed setting data, the duplex control section 301 stores the changed setting data to the setting storing section 302.

Likewise, whenever setting of the first wireless LAN base station 100 which is in the active state is changed, the changed setting is stored to the setting storing section 302 of the management server 300.

When the duplex control section 301 receives an activation completion notice, the duplex control section 301 reads setting data from the setting storing section 302 and sends a setting request and the setting data to a second wireless LAN base station 200 (at step S47 and S48).

According to the forth embodiment, before a fault occurs, setting of a wireless LAN base station that is in an active state is stored in a management server, setting of a plurality of wireless LAN base stations can be automatically backed up as a new effect of the present invention.

Fifth Embodiment

A fifth embodiment of the present invention is different from the third embodiment or the fourth embodiment in that the former has a duplex control section in a wireless LAN base station that is in a standby state or a management server so as to periodically confirm whether or not a wireless LAN base station that is in an active state is alive.

When the wireless LAN base station which is in the active state receives a live confirm inquiry, the wireless LAN base station sends a live confirm response to a wireless LAN base station that is in a standby state or the management server.

When the wireless LAN base station that in the standby state or the management server cannot receive the live confirm response successively a predetermined number of times (for example, three times), the wireless LAN base station or the management server determines that a fault occurred in the wireless LAN base station which is in the active state places in the active state a wireless LAN base station which is in the standby state, and restores the wireless communication in which the fault occurred.

Alternatively, a wireless LAN base station that is in an active state may periodically send a live notice instead of receiving a live confirm inquiry. When the live notice cannot be received, it may be determined that a fault occurred in the wireless LAN base station which is in the active state.

According to the fifth embodiment, the management server or a wireless LAN base station that is in a standby state detects a fault of a wireless LAN base station that is in an active state, even if it cannot send a fault notice due to a fault of hardware, power off, or a cable disconnection, the operation of the wireless LAN base station can be restored as a new effect of the present invention.

Sixth Embodiment

Figure 9:
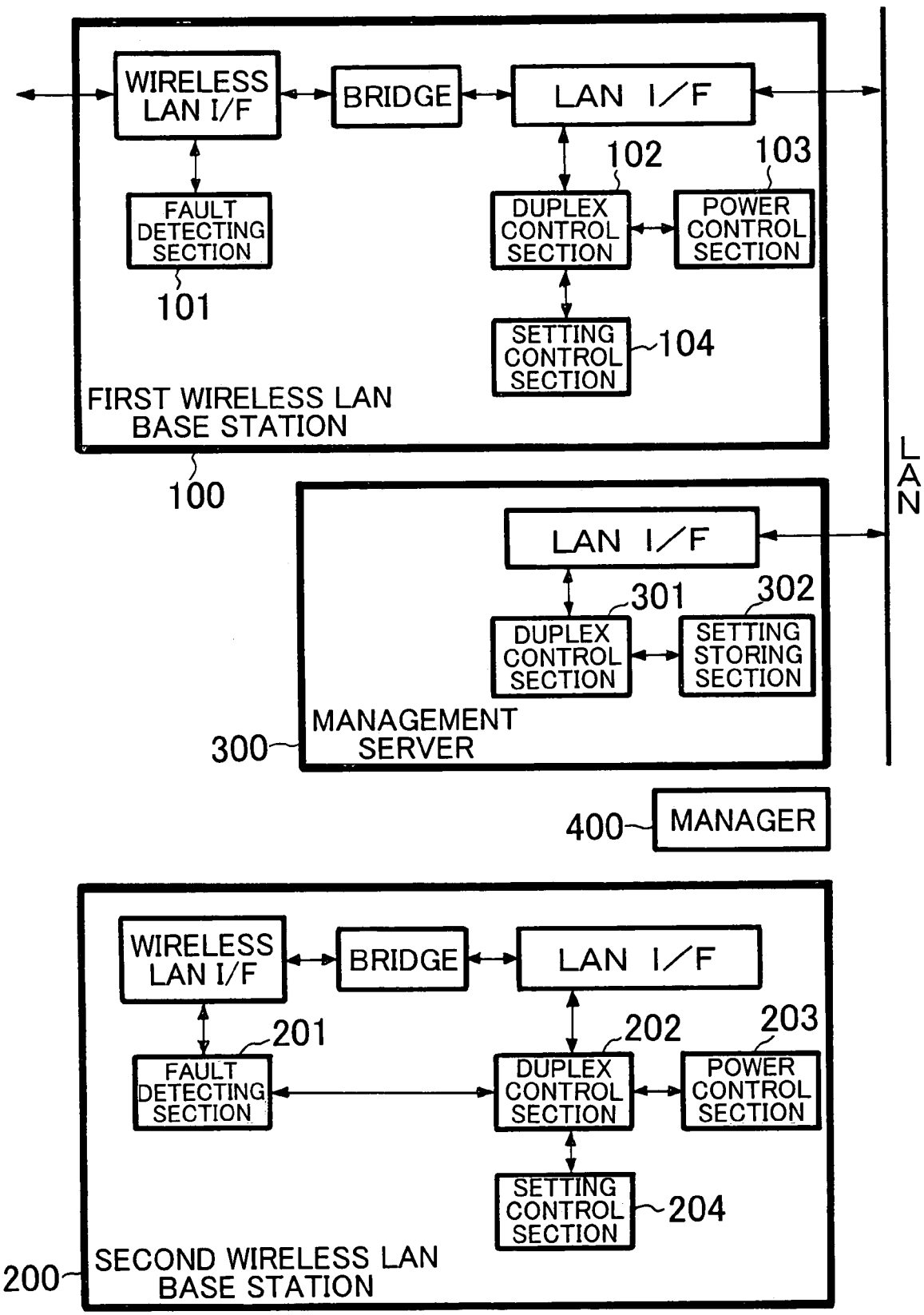
FIG. 9 is a schematic diagram showing a structure of a sixth embodiment of the present invention.

FIG. 9 shows a structure of a sixth embodiment of the present invention. The sixth embodiment is different from the fourth embodiment in that the former has a duplex control section 301 that has stored a mail address of a manager 400 who manages a fault and sends a fault notice to the manager 400 and that a second wireless LAN base station 200 is not disposed in the same support area as a first wireless LAN base station 100 that is in an active state along with the structure of the fourth embodiment shown in FIG. 7.

The management server 300 has stored setting of the first wireless LAN base station 100 which is in the active state in a setting storing section 302. This sequence of the operation of the sixth embodiment is the same as S41 to S43 shown in FIG. 8.

When a duplex control section 301 receives a fault detection notice from the wireless LAN base station which is in the active state, the duplex control section 301 sends a fault notice and information of the wireless LAN base station in which the fault occurred to the manager 400 who manages a fault by mail or the like.

When the manager 400 receives the fault notice, he or she replaces the wireless LAN base station, in which the fault occurred, with the spare wireless LAN base station 200.

The management server 300 places the second wireless LAN base station 200 in the active state and reflects setting data stored in the setting storing section 302 in the second wireless LAN base station 200.

According to the sixth embodiment, when there is a spare wireless LAN base station, it is not necessary to prepare a wireless LAN base station that is in a standby state for each wireless LAN base station that is in an active state. Thus, the number of wireless LAN base stations can be reduced as a new effect of the present invention.

Seventh Embodiment

A seventh embodiment has the same structure as the first embodiment, the second embodiment, or the third embodiment except that the former has a fault detecting section that has a fault predicting function.

A fault is predicted by the fault detecting section according to error information that a wireless LAN driver has. When the packet discard rate is abnormally high or the number of transmitted/received packets is 0 (the function of the wireless LAN I/F is stopped), the fault detecting section determines that a fault occurred. A plurality of parameters with which occurrence of a fault is determined may be used. Alternatively, a fault may be determined in a combination of conditions.

When the fault detecting section predicts a fault of a wireless LAN base station that is in an active state, the duplex control section sends a fault prediction notice to the management server or a wireless LAN base station that is in a standby state, places in the active state the wireless LAN base station which is in the standby state, and reflects the setting of the wireless LAN base station whose fault the fault detecting section has predicted in the wireless LAN base station which is in the standby state.

According to the seventh embodiment, before a fault occurs, a wireless LAN base station whose fault the fault detecting section predicted is switched to a wireless LAN base station that is in a standby state. Thus, users of a wireless LAN base station in which a fault occurred are not adversely affected as a new effect of the present invention.

Eighth Embodiment

Figure 10:
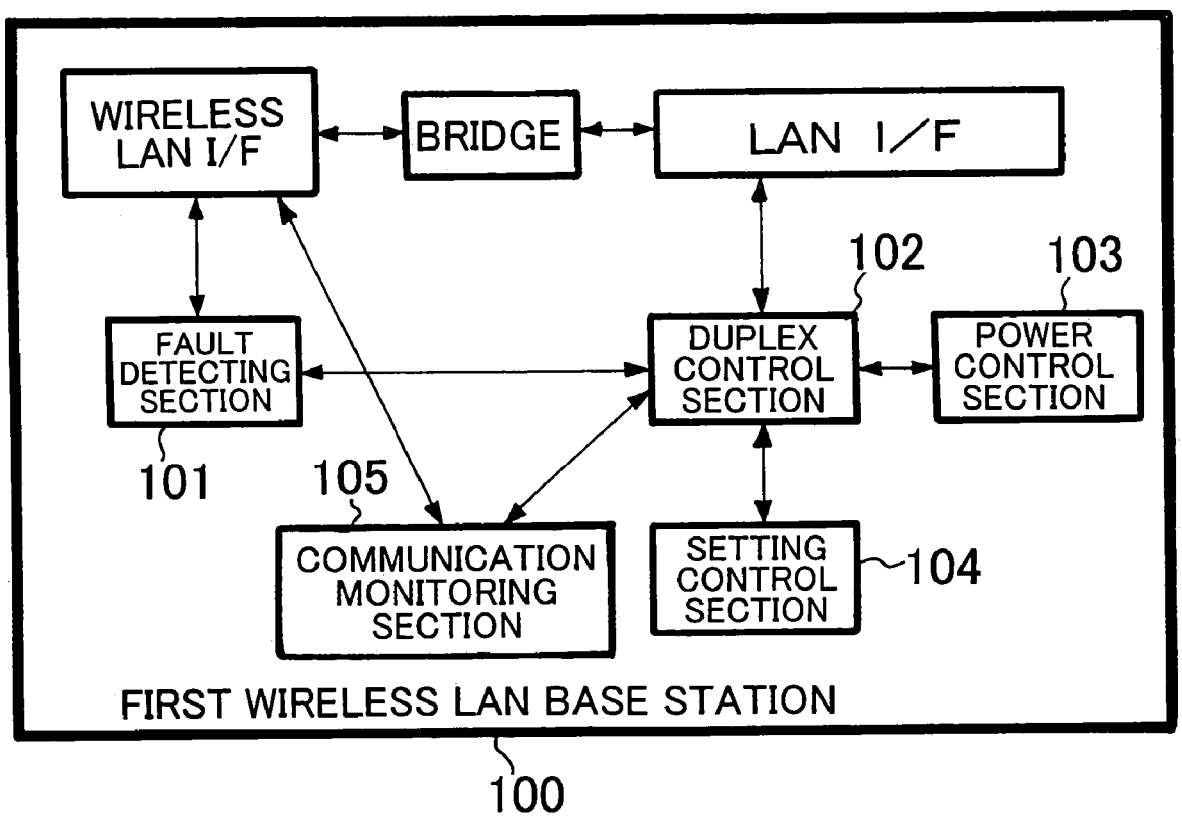
FIG. 10 is a schematic diagram showing a structure of an eighth embodiment of the present invention.

An eighth embodiment is different from the seventh embodiment in that the former has a communication monitoring section 105 (shown in FIG. 10) that monitors a communication state of a first wireless LAN base station 100 that is in an active state along with the structure of the seventh embodiment.

When the fault detecting section 101 predicts that a fault occurred in a first wireless LAN base station 100 which is in the active state, the communication monitoring section 105 confirms that there is no wireless LAN client that is communicating. Thereafter, the duplex control section 102 switches the wireless LAN base station in which the fault occurred to the other wireless LAN base station.

According to the eighth embodiment, when there is no communicating client, a wireless LAN base station in an active state is switched to a wireless LAN base station that is in a standby state. Thus, when they are switched, packet loss and communication disconnection can be prevented as a new effect of the present invention.

As described above, according to the present invention, when a fault occurs at an access point and a communication state deteriorates, communication can be automatically restored. As a result, the reliability of the wireless LAN system can be improved.

This is because wireless LAN base stations are duplexed and when a fault occurs in a wireless LAN base station that is in an active state, a wireless LAN base station that is in a standby state is operated with the same setting as that in the active state.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A duplex system having a first wireless LAN base station and a second wireless LAN base station,
   wherein each of the first wireless LAN base station and the second wireless LAN base station comprises:
   a fault detecting section for detecting a fault of the local wireless LAN base station in which it resides and generating a fault detection signal;
   a duplex control section for storing an address of a duplex party of the wireless LAN base station, sending and receiving a control signal to and from the duplex party, and controlling each of sections according to the control signal;
   a power control section for placing the local wireless LAN base station in an active state or a standby state according to a command received from the duplex control section; and
   a setting control section for storing setting of the local wireless LAN base station and sending and receiving the setting of the local wireless LAN base station according to a command received from the duplex control section,
   wherein when the first wireless LAN base station which is in the active state detects a fault, the first wireless LAN base station is configured to send an activation request to the second wireless LAN base station which is in the standby state,
   wherein when the first wireless LAN base station confirms that the second wireless LAN base station has been placed in the active state, the first wireless LAN base station is configured to send setting thereof to the second wireless LAN base station, and
   wherein when the first wireless LAN base station confirms that the setting of the second wireless LAN base station is the same as the setting of the first wireless LAN base station, the first wireless LAN base station is configured to be placed in the standby state.

2. A duplex system having a first wireless LAN base station, a second wireless LAN base station, and a management server,
   wherein each of the first wireless LAN base station and the second wireless LAN base station comprises:

a fault detecting section for detecting a fault of the local wireless LAN base station in which it resides and generating a fault detection signal;

a duplex control section for storing an address of the management server, sending and receiving a control signal to and from the management server, and controlling each of sections according to the control signal;

a power control section for placing the local wireless LAN base station in an active state or a standby state according to a command received from the duplex control section; and a setting control section for storing setting of the local wireless LAN base station and sending and receiving the setting according to a command received from the duplex control section, wherein the management server comprises:

a server side duplex control section for storing each address of the first wireless LAN base station and the second wireless LAN base station, sending and receiving a control signal to and from each of the first wireless LAN base station and the second wireless LAN base station, and controlling each of sections according to the control signal, wherein when the first wireless LAN base station which is in the active state detects a fault thereof, the first wireless LAN base station is configured to send a fault detection notice to the management server and the management server is configured to send an activation request to the second wireless LAN base station which is in the standby state, wherein when the management server confirms that the second wireless LAN base station has been placed in the active state, the management server is configured to send a setting data request to the first wireless LAN base station, the first wireless LAN base station is configured to send setting thereof to the management server, and the management server is configured to send the setting of the first wireless LAN base station to the second wireless LAN base station, and wherein when the management server confirms that the setting of the second wireless LAN base station is the same as the setting of the first wireless LAN base station, the management server is configured to send a standby request to the first wireless LAN base station and the first wireless LAN base station is configured to be placed in the standby state.

3. A duplex system having a first wireless LAN base station and a second wireless LAN base station, wherein each of the first wireless LAN base station and the second wireless LAN base station compnses:

a fault detecting section for detecting a fault of the local wireless LAN base station in which it resides and generating a fault detection signal;

a duplex control section for storing an address of a duplex party of the wireless LAN base station, sending and receiving a control signal to and from the duplex party, and controlling each of sections according to the control signal;

a power control section for placing the local wireless LAN base station in an active state or a standby state according to a command received from the duplex control section; and a setting control section for storing setting of the local wireless LAN base station and sending and receiving the setting of the local wireless LAN base station according to a command received from the duplex control section, wherein when the first wireless LAN base station which is in the active state detects changed setting, the first wireless LAN base station is configured to send changed setting data to second wireless LAN base station which is in the standby state, the second wireless LAN base station is configured to reflect the received changed setting data in setting of the second wireless LAN base station, wherein when the first wireless LAN base station detects a fault, the first wireless LAN base station is configured to send an activation request to the second wireless LAN base station, and wherein when the first wireless LAN base station confirms that the second wireless LAN base station has been placed in the active state, the first wireless LAN base station is configured to be placed in the standby state.

4. A duplex system having a first wireless LAN base station, a second wireless LAN base station, and a management server, wherein each of the first wireless LAN base station and the second wireless LAN base station comprises:

a fault detecting section for detecting a fault of the local wireless LAN base station in which it resides and generating a fault detection signal;

a duplex control section for storing an address of the management server, sending and receiving a control signal to and from the management server, and controlling each of sections according to the control signal;

a power control section for placing the local wireless LAN base station in an active state or a standby state according to a command received from the duplex control section; and a setting control section for storing setting of the local wireless LAN base station and sending and receiving the setting according to a command received from the duplex control section, wherein the management server comprises:

a server side duplex control section for storing each address of the first wireless LAN base station and the second wireless LAN base station, sending and receiving a control signal to and from each of the first wireless LAN base station and the second wireless LAN base station, and controlling each of sections according to the control signal, wherein when the first wireless LAN base station which is in the active state detects changed setting, the first wireless LAN base station is configured to send changed setting data to the management server, the management server is configured to send the changed setting data to the second wireless LAN base station which is in the standby state, and the second wireless LAN base station is configured to reflect the received changed setting data in setting thereof, wherein when the first wireless LAN base station detects a fault, the first wireless LAN base station is configured to send a fault detection notice to the management server and the management server is configured to send an activation request to the second wireless LAN base station, and wherein when the management server confirms that the second wireless LAN base station has been placed in the active state, the management server is configured to send a standby request to the first wireless LAN base station and the first wireless LAN base station is configured to be placed in the standby state.

5. A duplex system having a first wireless LAN base station, a second wireless LAN base station, and a management server,
wherein each of the first wireless LAN base station and the second wireless LAN base station comprises:
a fault detecting section for detecting a fault of the local wireless LAN base station in which it resides and generating a fault detection signal;
a duplex control section for storing an address of the management server, sending and receiving a control signal to and from the management server, and controlling each of sections according to the control signal;
a power control section for placing the local wireless LAN base station in an active state or a standby state according to a command received from the duplex control section;
a setting control section for storing setting of the local wireless LAN base station and sending and receiving the setting according to a command received from the duplex control section,
wherein the management server comprises:
a server side duplex control section for storing each address of the first wireless LAN base station and the second wireless LAN base station, sending and receiving a control signal to and from each of the first wireless LAN base station and the second wireless LAN base station, and controlling each of sections according to the control signal; and
a setting storing section for storing changed setting data of a wireless LAN base station which is in the active state,
wherein when the first wireless LAN base station which is in the active state detects changed setting, the first wireless LAN base station is configured to send changed setting data to the management server and the management server is configured to store the changed setting data in the setting storing section,
wherein when the first wireless LAN base station detects a fault, the first wireless LAN base station is configured to send a fault detection notice to the management server and the management server is configured to send an activation request to the second wireless LAN base station which is in the standby state,
wherein when the management server confirms that the second wireless LAN base station has been placed in the active state, the management server is configured to send the changed setting data stored in the setting storing section to the second wireless LAN base station, and
wherein when the management server confirms that the setting of the second wireless LAN base station is the same as the setting of the first wireless LAN base station, the management server is configured to send a standby request to the first wireless LAN base station and the first wireless LAN base station is configured to be placed in the standby state.

6. The duplex system as set forth in claim 3,
wherein the duplex control section of the first wireless LAN base station which is in the standby state, or the management server is configured to periodically confirm whether the wireless LAN base station which is in the active state is alive, and
wherein when the duplex control section confirms that the wireless LAN base station which is in the active state has not been alive a predetermined number of times, the duplex control section is configured to place in the active state the second wireless LAN base station which is in the standby state.

7. The duplex system as set forth in claim 4,
wherein the duplex control section of the first wireless LAN base station which is in the standby state, or the management server is configured to periodically confirm whether the wireless LAN base station which is in the active state is alive, and
wherein when the duplex control section confirms that the wireless LAN base station which is in the active state has not been alive a predetermined number of times, the duplex control section is configured to place in the active state the second wireless LAN base station which is in the standby state.

8. The duplex system as set forth in claim 5,
wherein the duplex control section of the first wireless LAN base station which is in the standby state, or the management server is configured to periodically confirm whether the wireless LAN base station which is in the active state is alive, and
wherein when the duplex control section confirms that the wireless LAN base station which is in the active state has not been alive a predetermined number of times, the duplex control section is configured to place in the active state the second wireless LAN base station which is in the standby state.

9. A duplex system having a wireless LAN base station which is in an active state and a management server,
wherein the wireless LAN base station comprises:
a fault detecting section for detecting a fault of the local wireless LAN base station in which it resides and generating a fault detection sigual;
a duplex control section for storing an address of the management server, sending and receiving a control signal to and from the management server, and controlling each of sections according to the control signal;
a power control section for placing the local wireless LAN base station in an active state or a standby state according to a command received from the duplex control section; and
a setting control section for storing setting of the local wireless LAN base station and sending and receiving the setting according to a command received from the duplex control section,
wherein the management server is configured to have stored a mail address of a manager who receives a fault, and
wherein when the management server receives the fault detection notice, the management server is configured to send a fault detection notice to the mail address of the manager.

10. The duplex system as set forth in claim 1,
wherein the fault detecting section has a fault predicting function, and
wherein when the fault detecting section predicts a fault, the duplex control section is configured to send a fault prediction notice to the management server or the wireless LAN base station which is in the standby state, and the management server or the wireless LAN base station which is in the active state is configured to perform an activating process for the wireless LAN base station which is in the standby state.

11. The duplex system as set forth in claim 2,
wherein the fault detecting section has a fault predicting function, and
wherein when the fault detecting section predicts a fault, the duplex control section is configured to send a fault prediction notice to the management server or the wireless LAN base station which is in the standby state, and the management server or the wireless LAN base station which is in the active state is configured to perform an activating process for the wireless LAN base station which is in the standby state.

12. The duplex system as set forth in claim 3,
wherein the fault detecting section has a fault predicting function, and
wherein when the fault detecting section predicts a fault, the duplex control section is configured to send a fault prediction notice to the management server or the wireless LAN base station which is in the standby state, and the management server or the wireless LAN base station which is in the active state is configured to perform an activating process for the wireless LAN base station which is in the standby state.

13. The duplex system as set forth in claim 4,
wherein the fault detecting section has a fault predicting function, and
wherein when the fault detecting section predicts a fault, the duplex control section is configured to send a fault prediction notice to the management server or the wireless LAN base station which is in the standby state, and the management server or the wireless LAN base station which is in the active state is configured to perform an activating process for the wireless LAN base station which is in the standby state.

14. The duplex system as set forth in claim 5,
wherein the fault detecting section has a fault predicting function, and
wherein when the fault detecting section predicts a fault, the duplex control section is configured to send a fault prediction notice to the management server or the wireless LAN base station which is in the standby state, and the management server or the wireless LAN base station which is in the active state is configured to perform an activating process for the wireless LAN base station which is in the standby state.

15. The duplex system as set forth in claim 9,
wherein the fault detecting section has a fault predicting function, and
wherein when the fault detecting section predicts a fault, the duplex control section is configured to send a fault prediction notice to the management server or the wireless LAN base station which is in the standby state, and the management server or the wireless LAN base station which is in the active state is configured to perform an activating process for the wireless LAN base station which is in the standby state.

16. The duplex system as set forth in claim 10,
wherein the wireless LAN base station which is in the active state has a communication monitoring section for monitoring a communication state of the local wireless LAN base station, and
wherein when the local wireless LAN base station predicts a fault, the communication monitoring section is configured to confirm that there is no communicating wireless LAN client and then the duplex control section performs a switching process for switching the wireless LAN base stations.

17. The duplex system as set forth in claim 11,
wherein the wireless LAN base station which is in the active state has a communication monitoring section for monitoring a communication state of the local wireless LAN base station, and
wherein when the local wireless LAN base station predicts a fault, the communication monitoring section is configured to confirm that there is no communicating wireless LAN client and then the duplex control section performs a switching process for switching the wireless LAN base stations.

18. The duplex system as set forth in claim 12,
wherein the wireless LAN base station which is in the active state has a communication monitoring section for monitoring a communication state of the local wireless LAN base station, and
wherein when the local wireless LAN base station predicts a fault, the communication monitoring section is configured to confirm that there is no communicating wireless LAN client and then the duplex control section performs a switching process for switching the wireless LAN base stations.

19. The duplex system as set forth in claim 13,
wherein the wireless LAN base station which is in the active state has a communication monitoring section for monitoring a communication state of the local wireless LAN base station, and
wherein when the local wireless LAN base station predicts a fault, the communication monitoring section is configured to confirm that there is no communicating wireless LAN client and then the duplex control section performs a switching process for switching the wireless LAN base stations.

20. The duplex system as set forth in claim 14,
wherein the wireless LAN base station which is in the active state has a communication monitoring section for monitoring a communication state of the local wireless LAN base station, and
wherein when the local wireless LAN base station predicts a fault, the communication monitoring section is configured to confirm that there is no communicating wireless LAN client and then the duplex control section performs a switching process for switching the wireless LAN base stations.

21. The duplex system as set forth in claim 15,
wherein the wireless LAN base station which is in the active state has a communication monitoring section for monitoring a communication state of the local wireless LAN base station, and
wherein when the local wireless LAN base station predicts a fault, the communication monitoring section is configured to confirm that there is no communicating wireless LAN client and then the duplex control section performs a switching process for switching the wireless LAN base stations.

* * * * *